United States Patent [19]
Dickey

[11] 3,966,329
[45] June 29, 1976

[54] PRECISION OPTICAL BEAM DIVIDER AND POSITION DETECTOR

[75] Inventor: Baron Christian Dickey, Palo Alto, Calif.

[73] Assignee: Ampex Corporation, Redwood City, Calif.

[22] Filed: Sept. 24, 1974

[21] Appl. No.: 508,918

[52] U.S. Cl. .............................. 356/152; 250/202; 356/172
[51] Int. Cl.² ........................................ G01B 11/26
[58] Field of Search ............ 250/202, 204; 356/141, 356/152, 172

[56] References Cited
UNITED STATES PATENTS
| | | | |
|---|---|---|---|
| 3,520,586 | 7/1970 | Bousky | 350/6 |
| 3,617,131 | 11/1971 | Taguchi | 356/152 |
| 3,627,428 | 12/1971 | Bergman | 356/172 |

Primary Examiner—Maynard R. Wilbur
Assistant Examiner—S. C. Buczinski

[57] ABSTRACT

An optical assembly defines a reflector or refractor element installed behind the film plane of an optical scanner or fixed beam system. Its function is to image the rear nodal plane of a spot forming lens of the optical beam system, onto a split diode photodetector. The optical assembly is split into at least two facing optical sections with a thin reflective interface formed therebetween, whereby is defined a very precise intersection between the two optical sections at the surface of entrance of the beam. A fixed or scanning spot impinging the precise intersection is divided into two parts, and each is focused and directed to separate diode photodetector means. The relative intensity between the two parts of the divided beam is used to indicate the lateral deviation of the spot position with respect to the intersection. The images formed at the photodetector may be made essentially stationary regardless of the position of a scanning spot as it moves along the line of intersection. The assembly may also be used as a four quadrant system for determining the position of a fixed beam.

10 Claims, 17 Drawing Figures

U.S. Patent   June 29, 1976   Sheet 1 of 3   3,966,329
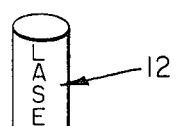
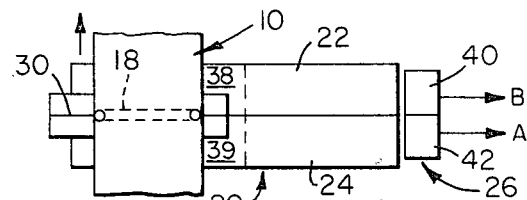
FIG_1
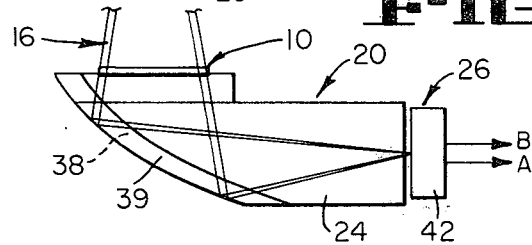
FIG_2
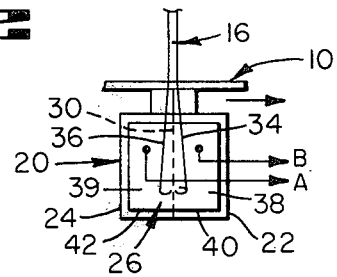
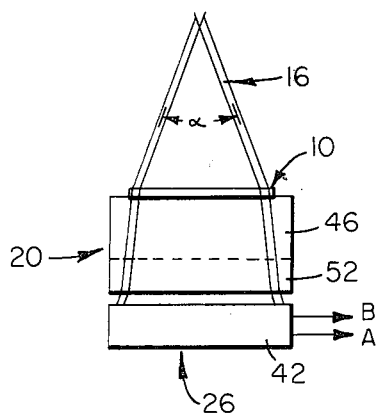
FIG_5
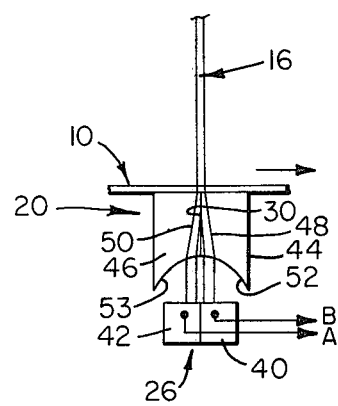
FIG_6

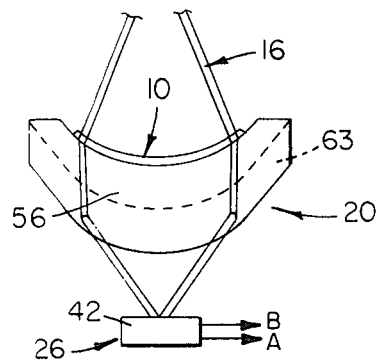
FIG_7
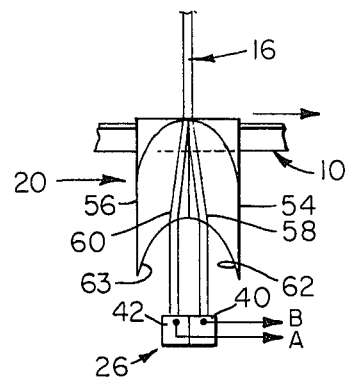
FIG_8
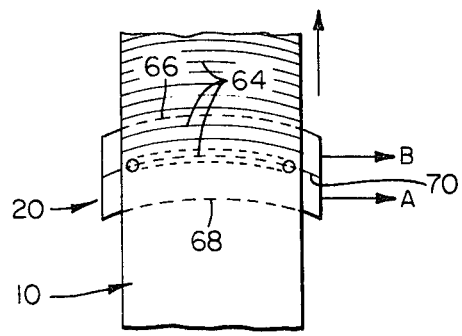
FIG_9
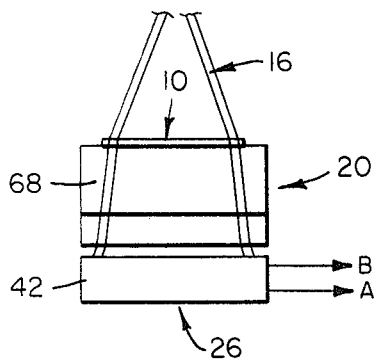
FIG_10
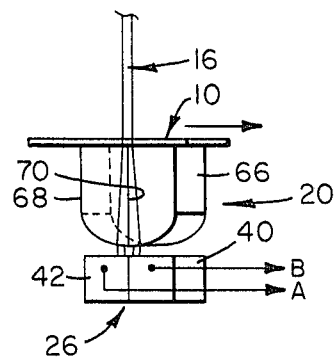
FIG_11

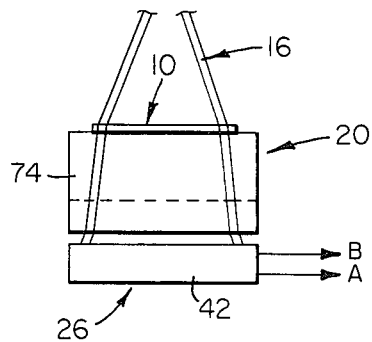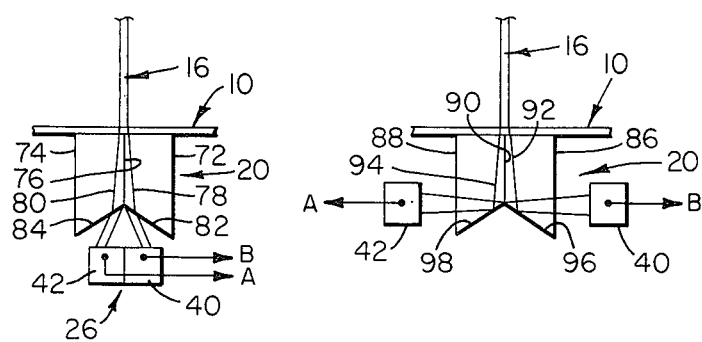
FIG_12  FIG_13  FIG_14
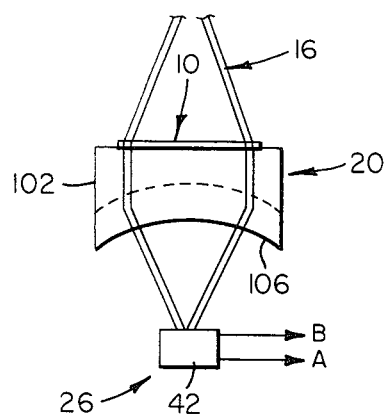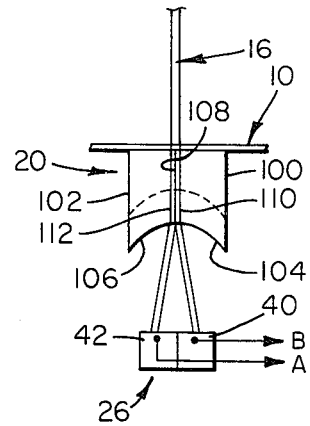
FIG_15  FIG_16
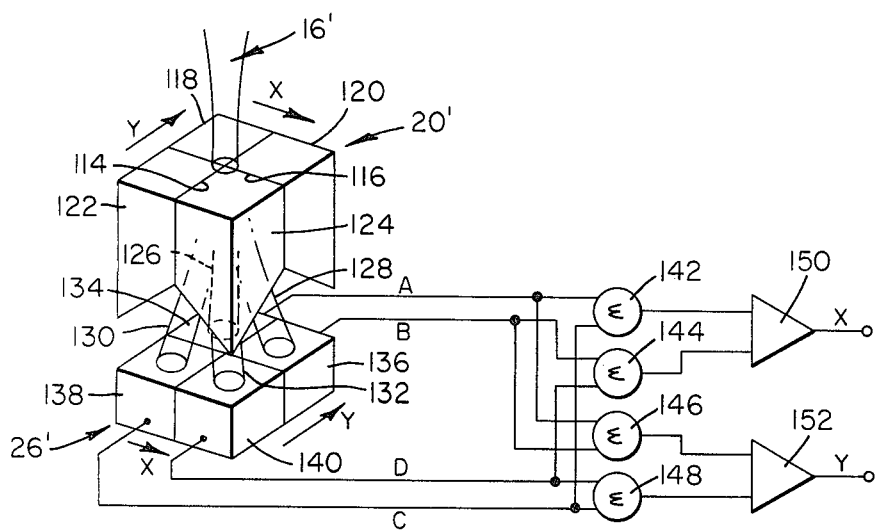
FIG_17

3,966,329

PRECISION OPTICAL BEAM DIVIDER AND POSITION DETECTOR

The invention herein described was made in the course of a contract with the U.S. Department of Defense.

BACKGROUND OF THE INVENTION

1. Field

The invention relates to light beam position detection systems, and particularly to an optical assembly for providing an extremely accurate division, and subsequent detection of the position, of very small fixed or scanning spots.

2. Prior Art

During the recording process of a light beam recorder, it is essential that the scanning light spot trace a very precise line, and that any scan variations from the intended line be readily detectable. To this end, beam position detection for a straight scan line may be achieved utilizing a knife edge and directing the scanning beam half on and half off the knife edge. Such a scheme, however, suffers from noise problems, since essentially half of the beam and a proportional amount of signal is discarded. Since only one half of the beam is used, the resulting detector electronics produces additive noise rather than multiplicative noise, as in the present dual beam, balanced, detection system. Additional noise problems are caused by the intensity variations in the beam appearing as scan deviations from the straight line, i.e., from the knife edge. Futhermore, it becomes extremely difficult if not impossible to fabricate a knife edge as straight and as sharp as would be required to provide an optimized assembly of practical application for detection of the position of spots in the micron diameter range.

Other schemes are available for dividing a beam into two or more beams for purposes of tracking, multiple beam scanning, and/or intensity regulation. However, such schemes perform the beam division by optical means, whereby the geometry of the beam stays the same. That is, the beam intensity is changed without a change in the shape of the beam.

Thus, at the present time, there are no means available for providing a precise division of scanning spots having diameters in the micron range, for purposes of detecting scanning spot deviations, or for determining the position of a small fixed spot at the entrance to a split optical lens.

SUMMARY OF THE INVENTION

The invention overcomes the shortcomings of the prior art by utilizing the fact that the technology of forming accurate glass surfaces is well advanced, whereby accuracies of 1/20 of a wavelength or better for flat or curved matching glass surfaces are attainable.

A divided optical assembly permits the generation of an output signal via a split diode photodetector, in response to the deviation of a spot generated in a fixed or scanning light beam system. The optical assembly includes split optical elements precisely matched at their confronting surfaces to define a precise interface formed therebetween. More particularly, the confronting surfaces of the split optical elements may be polished to an optical accuracy of 1/20 wave or better, coated with a suitable reflecting agent such as nichrome to the thickness of the order of 300A, optically contacted together to assure a minimal parallel gap interface, cemented, wrung or clamped together, and polished at the scanning spot receiving surface to provide a smooth, clean surface at the intersection, i.e., the precise line formed by the interface along the top of the assembly.

A scanning beam spot, disposed to scan along the precise intersection of the interface, is divided into two beam parts, and the relative intensities of the parts are detected via a differential concept to indicate the spot position. The two parts of the beam pass into respective halves (elements) of the assembly as defined by the interface. The beam parts are directed via optical refractor or reflector means to a given spot, a given area, or along a given line, throughout the scan angle of the scanning beam. In the scanning embodiments, the scan beam image at the split diode photodetector may be focussed at a point, whereby the image essentially is stationary regardless of the position of the scanning spot as it moves along the intersection.

In a fixed beam system, the beam is divided into four parts via a four quadrant version of the invention, and the parts are directed to four respective photodetectors to determine any lateral deviation of the fixed beam in the x and y directions relative to a fixed point.

BRIEF DESCRIPTION OF THE DRAWINGS

FIG. 1 is a perspective depicting a simplified block diagram of a light scanner system employing the invention concept.

FIGS. 2, 3 and 4 are plan, elevation and end views respectively of an embodiment of the invention combination employing reflector optical elements.

FIGS. 5 and 6 are elevation and end views respectively of an alternative embodiment of the invention combination employing refractor optical elements.

FIGS. 7 and 8 are elevation and end views respectively of an alternative embodiment of the invention combination employing refractor optical elements.

FIGS. 9, 10, 11 are plan, elevation and end views respectively of a modification of the refractor combination of FIGS. 5, 6.

FIGS. 12, 13 and 15, 16 are elevation and end views respectively of alternative embodiments employing refractor optical elements.

FIG. 14 is an end view of a modification of the combination of FIGS. 12, 13 employing a reflector optical element.

FIG. 17 is a perspective view of a four quadrant divider/detector for determining the deviation of a fixed optical beam.

DESCRIPTION OF THE PREFERRED EMBODIMENTS

Referring to FIG. 1, there is shown in simplified block diagram a light beam scanner system such as employed to record information on a light sensitive recording medium 10. To this end, a laser 12 delivers a light beam to spot forming scan optics means 14 which, in turn, impinges a scan beam 16 of selected scan angle $\alpha$, upon the medium 10. The scanning light beam may be a collimated beam or may be focussed to form a diffraction limited spot, and is disposed to generate a scan line (indicated at 18) across the film 10, as in conventional laser beam record/reproduce devices. The spot forming scan optics means thus generally includes various optical components for generating a beam scan through a selected scan angle, while providing a selected spot size. Such scan optics are described, for example, in U.S. Pat. No. 3,520,586 and copending U.S. patent application Ser. No. 395,780 (now issued as U.S. Pat. No. 3,873,180) and Ser. No. 467,872, all assigned to the assignee of this application.

A method of monitoring the scanning optical beam at the film plane is desirable for purposes of aligning and testing the recorder system. A primary advantage of such a monitoring apparatus is the capability of detecting scan line deviations, curvatures and skew. To this end, a fiducial line is desirably introduced along the film plane during the record process, which line is straight to an accuracy of the order of one microinch over a scan length of, for example, one-half inch. The invention combination infra provides a scan line detection with the desired sensitivity and accuracy.

To this end, a retro-optic split optical assembly 20 in accordance with the invention is formed of confronting optical elements 22, 24 and is disposed behind the film plane, i.e., behind the medium 10. Its optical function is to image the rear nodal plane of the scanning spot formed by the scan optics means 16 onto a split diode photodetector 26.

A pair of electrical signals (A and B) are generated by the photodetector 26, which signals are proportional to the extent of lateral deviation of the scan spot from the scan line 18 as it scans along the fiducial line. The split optical assembly 20 may be formed of reflector or refractor optical elements, as further described in the various embodiments infra. The signals A, B are introduced to a detector circuit 28 which provides a differential balance output signal A—B at terminal 27 which is indicative of the deviation of the scan spot from the fiducial line. A terminal 29 provides an output signal A+B which is the summation of the signals from the photodetectors, and which may represent the information recorded in the medium 10 during the recording process. The output signal A—B is generated by a differential amplifier 31, while the output signal A+B is generated by a summing amplifier 33.

In FIGS. 2–4, a reflector element version of the invention includes the split optical assembly 20 with confronting optical elements 22, 24 formed with precision reflective surfaces at an interface 30 therebetween. A resulting precise intersection (line) corresponding to the desired fiducial line of previous mention is thus defined by the interface 30, which is formed, in turn, of the highly polished surfaces themselves, of a very thin reflective coating on one surface, or of thin reflective coatings on both confronting surfaces, as further described infra. The scanning beam 16, and thus the scan spot thereof, is directed in register along the precise intersection, whereby the spot and thus the beam is divided into two beam parts 34, 36 (FIG. 4). The relative intensities of these two parts 34, 36 is used to indicate the spot position relative to the line of the intersection, since deviation of the spot towards one side is accompanied by an increase in light introduced to that element of the split optical assembly 20, and a corresponding decrease in light to the other element.

Each of the two beam parts 34, 36 of the scanning beam impinge a respective spherical reflector surface 38, 39, which define the means for directing the beam parts within the elements 22, 24. In this embodiment, the latter reflect the beams 34, 36 therefrom to image the nodal plane of the spot forming lens (not shown) of the scan optics means 14 upon respective diodes 40, 42 of the split diode photodetector 26 of previous mention. Due to the spherical geometry of the reflector surfaces 38, 39, the images generated at the photodetector in this embodiment are essentially stationary regardless of the instantaneous position of the scanning beam, i.e., of the two beam parts 34, 36 thereof, along the intersection.

Since the scan spot is divided via the reflective interface 30, the intensities of the parts 34, 36 of the scanning beam vary in accordance with the lateral deviation of the scan spot from the fiducial line defined by the precise intersection. For example, if the spot deviates in the lateral direction towards optical element 22, then correspondingly greater than half the light from the beam 16 forms the beam part 34, which is reflected via the spherical reflector surface 38 to the associated photodetector 40 of the split diode photodetector 26. It follows that the photodetector 40 generates a correspondingly larger output signal, while photodetector 42 generates a correspondingly smaller output signal. Thus the relative intensities of the beam parts 34, 36 are directly indicative of the amount of deviation of the scanning beam 16 as it scans along the precise intersection, i.e., along the fiducial line. The resulting electrical signals A and B are utilized to align and/or test the recorder system operation. Alternately, the signals may be used in a feedback tracking scheme to correct the beam deviation during generation of the scan line 18 as when recording.

In fabrication, the split optical assembly 20 may be formed by splitting an optical blank into the two elements 22, 24. The confronting surfaces thereof are then polished to a flatness of the order of 1/20 wave. In a preferred embodiment, the polished surfaces are coated with nichrome to a thickness of the order of 300A via, for example, a vacuum evaporation, vacuum deposition, sputtering, etc. process. The coated elements 22, 24 are then optically contacted together to assure the very thin precise interface 30, and are wrung together and/or clamped to hold them firmly together. The surface of the assembly 20 which bears against the recording medium 10 is polished to provide a smooth, clean surface at the line of intersection.

Ordinary cementing of the elements 22, 24 forms an intersection of approximately 12 microns width, or double the width of a typical scan spot. This is obviously undesirable. Accordingly, optically contacting and then wringing or clamping the elements together is preferable, which provides an intersection of less than 1 micron in width. However, the elements may also be optically contacted and then bonded together with cemennt via capillary action. The relatively thin reflective coating (or coatings) is substantially transparent to light at normal incidence for checking the optical contact, but highly reflective for light rays at glancing incidence as in normal operation.

FIGS. 5 and 6 depict a refractor element version of the invention combination, wherein the split optical assembly 20 employs a pair of confronting optical refractor lens elements 44, 46 with the precision reflective surfaces of previous mention forming the interface 30 therebetween. The precise line of intersection is thus defined by the interface 30 as in the previous embodiment. The scanning beam 16 is divided into beam parts 48, 50 via the interface, and these are directed by respective cylindrical refractor lens surfaces 52, 53 to impinge respective diodes 40, 42 of the split diode photodetector 26. As in the reflective embodiment supra, the relative intensities of the beam parts 48, 50 detected by respective photodetectors 40, 42 indicate the lateral deviation of the scanning spot relative to the intersection. In this embodiment, however, the beam parts 48, 50 are not focussed to a stationary point, but travel along respective separate planes through the scan angle $\alpha$. Thus the photodetectors 40, 42 here are elongated, or comprise a series of photodetectors disposed to receive the beam parts along their length of scan.

FIGS. 7 and 8 depict a modified refractor element version of the invention, which is similar to that of FIGS. 5, 6, but wherein a canoe geometry is employed as when utilizing an arcuate scanning beam with a curved recording medium 10. Thus optical refractor lens elements 54, 56 are formed to define a precise, concave intersection therebetween against which the recording medium 10 is formed in a curve. Such a canoe geometry is employed in light beam record/reproduce systems, wherein the scanning beam sweeps through an arcuate, rather than a flat, scan field. In addition, the beam parts 58, 60 formed by the interface, are focussed via refractor spherical lens surfaces 62, 63 to a stationary point on the face of respective diode photodetectors 40, 42. Thus the embodiment of FIGS. 7, 8 provides a de-scanning function in the manner of FIGS. 2–4.

FIGS. 9, 10 and 11 depict still a further modified refractor element version of the invention combination, wherein the scanning beam 16 describes an arcuate scan path 64 in the plane of the (flat) recording medium 10. It follows that the optical refractor elements 66, 68 are shaped to provide correspondingly curved, confronting surfaces which lie transverse to the plane of the medium. The confronting surfaces are coated as previously described to provide a curved reflective interface 70 therebetween, which defines the precise line of intersection along which the scanning beam 16 is to follow. The split diode photodetectors 40, 42 in this embodiment also are elongated and disposed along the curve of the interface of the confronting surfaces of the refractor elements 66, 68.

FIGS. 12, 13 depict another modified refractor element version of the invention, which is similar to that of FIGS. 5, 6. A pair of optical refractor elements 72, 74 are disposed in confronting relation to define a precise interface 76. The direction of beam parts 78, 80 divided by the interface 76 is accomplished via lens surfaces 82, 84 respectively. The beam parts 78, 80 are introduced to respective halves of the photodetectors 40, 42 along the corresponding scan lines thereof.

FIG. 14 shows an end view of a reflector element version comprising a modification of the embodiment of FIGS. 12, 13. To this end, a pair of confronting optical elements 86, 88 provide an interface 90 which divides the beam 16 into beam parts 92, 94. Reflector surfaces 96, 98 are provided for reflecting the impinging beam parts 92, 94 respectively to individual diode photodetectors 40, 42. As may be seen, the photodetectors 40, 42 in FIG. 14 are not an integral unit but are separated at opposite sides of the optical assembly 20.

FIGS. 15, 16 depict yet another modification of the invention employing a selected refractor element configuration. A pair of confronting optical refractor elements 100, 102 include spherical refractor surfaces 104, 106 respectively wherein the elements divide the beam via an interface 108 therebetween, and focus the resulting beam parts 110, 112 to a point on respective split diode photodetectors 40, 42. Thus the latter embodiment also provides a de-scanning function of the scanning beam 16.

FIG. 17 depicts a further embodiment of the invention combination, employing a four quadrant split optical assembly 20 utilized with a fixed or stationary optical beam for detecting the beam position relative to a fixed point. The optical beam assembly 20 thus comprises a single optical blank split into four quadrants wherein confronting surfaces along a y axis define a precise interface 114, and the confronting surfaces along the x axis define a precise interface 116. The interfaces 114, 116 lie at right angles thereby defining four optical elements 118–124. Accordingly, a fixed optical beam 16' impinging the point of interception of the lines of intersection formed by the interfaces 114, 116, generates four beam parts 126–132 within the respective optical elements 118–124. The latter elements are provided with refractor surfaces in the manner of the embodiment of FIGS. 12, 13, whereby the respective beam parts are directed to respective photodiodes of a four quadrant photodiode means 26'. The respective photodiodes 134–140 then generate resulting electrical signals A, B, C and D proportional to the intensities of the beam parts 126–132 respectively. Any deviation of the fixed beam 16' from the point of intersection of the interfaces results in a corresponding increase and decrease of light to the various optical elements 118–124, causing a corresponding increase and decrease respectively of the signals A–D generated by respective photodetectors 134–140.

Signal A is introduced to summing junctions 142, 146, and signal B is introduced to summing junctions 144, 146. Signals C and D are introduced to summing junctions 142, 148 and 144, 148 respectively. The outputs from summing junctions 142, 144 are introduced to differential amplifier 150 while the outputs from summing junctions 146, 148 are introduced to differential amplifier 152. The latter amplifiers 150, 152 thus provide outputs indicative of the deviation of the fixed optical beam 16' in the x and y directions respectively. That is, the logic circuit formed of elements 142–152 are designed to conform to the equations $(A+C)-(B+D)=x$ and $(C+D)-(A+B)=y$.

I claim:

1. A split optical assembly for monitoring the lateral deviation of an optical beam in a light beam system from a selected position, wherein the optical beam is introduced to the assembly via a spot forming lens having a rear nodal plane, and wherein the beam scans along a selected scan path in the region of a recording medium, the assembly comprising the combination of;

single optical means formed of a split optical element for directly receiving the optical beam and for dividing the beam into at least two simultaneous beam parts within the same element, the split optical element defining confronting optical elements defining therebetween a line of intersection corresponding to the selected scan path, whereby the two simultaneous beam parts are formed as the optical beam scans along and is continuously divided by the intersection, said optical elements further having confronting surfaces wherein the line of intersection thereof defines a precise reflective interface with an optical accuracy of the order of 1/20 wave;

said split optical element including an optical surface to selectively image the rear nodal plane of the spot forming lens;

wherein any lateral deviation of the optical beam from the precise reflective interface correspondingly varies the relative sizes and thus the intensities of the two beam parts; and split transducer means including split diode photodetector means disposed to simultaneously receive respective beam parts and thus the images formed via the split optical element itself as the optical beam scans along the interface, to continuously generate a pair of selective output signals indicative of the relative intensities of the divided beam parts and thus of the lateral deviation of the optical beam relative to the precise reflective interface.

2. The optical assembly of claim 1 further comprising, a detector circuit coupled to the split diode photodetector means and including differential amplifier means for generating a continuous deviation output signal equal to the difference between the electrical output signals from the photodetector means and corresponding to the lateral position of the optical beam relative to the precise reflective interface.

3. The optical assembly of claim 1 wherein the precise intersection defines a curved line in the plane of the recording medium, and the photodetectors extend along the curved line to receive the respective beam parts along the length of scan.

4. The optical assembly of claim 1 wherein the precise intersection defines a straight line along the direction of optical beam scan.

5. The optical assembly of claim 4 wherein the precise intersection defines the straight line along the direction of scan, and further lies along a concave surface facing the optical beam.

6. The optical assembly of claim 1 wherein the optical elements are optical reflectors which selectively and continuously direct the simultaneous beam parts along their entire scans to respective split diode photodetectors.

7. The optical assembly of claim 6 wherein the optical reflectors are spherical reflectors which focus the beam parts to a stationary point at the respective split diode photodetectors at all points along the optical beam scan to thus de-scan the beam.

8. The optical assembly of claim 1 wherein the optical elements are optical refractors which selectively and continuously direct the simultaneous beam parts along their entire scans to respective split diode photodetectors.

9. The optical assembly of claim 8 wherein the optical refractors are spherical refractor lenses which focus the beam parts to a stationary point at the respective split diode photodetectors at all points along the optical beam scan to thus de-scan the beam.

10. The optical assembly of claim 1 wherein the precise reflective interface includes at least one thin coating of the order of 300A of a reflective material disposed on at least one confronting surface, wherein the matching optical elements are tightly secured together.

* * * * *